(12) United States Patent
Xia

(10) Patent No.: US 11,256,303 B2
(45) Date of Patent: Feb. 22, 2022

(54) SHAFT STRUCTURE AND ELECTRONIC DEVICE

(71) Applicant: Lenovo (Beijing) Co., Ltd., Beijing (CN)

(72) Inventor: Xiaosong Xia, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 0 days.

(21) Appl. No.: 15/900,053

(22) Filed: Feb. 20, 2018

(65) Prior Publication Data

US 2018/0246545 A1 Aug. 30, 2018

(30) Foreign Application Priority Data

Feb. 24, 2017 (CN) .......................... 201710102196.9

(51) Int. Cl.
*G06F 1/16* (2006.01)

(52) U.S. Cl.
CPC .......... *G06F 1/1681* (2013.01); *G06F 1/1616* (2013.01); *G06F 1/1647* (2013.01)

(58) Field of Classification Search
CPC ..... G06F 1/1681; G06F 1/1616; G06F 1/1647
See application file for complete search history.

(56) References Cited

U.S. PATENT DOCUMENTS

| 8,474,101 | B2* | 7/2013 | Wang ..................... | G06F 1/1681 16/354 |
| 8,578,561 | B2* | 11/2013 | Chuang ................. | G06F 1/1681 16/354 |
| 9,507,388 | B1* | 11/2016 | Hampton .............. | G06F 1/1681 |
| 2005/0050686 | A1* | 3/2005 | Kurokawa ........... | G06F 1/1618 16/354 |
| 2008/0184530 | A1* | 8/2008 | Chao ..................... | E05D 7/1061 16/342 |
| 2011/0085289 | A1* | 4/2011 | Park ...................... | G06F 1/1681 361/679.27 |
| 2011/0128216 | A1* | 6/2011 | Renwick .............. | G06F 1/1618 345/156 |

(Continued)

FOREIGN PATENT DOCUMENTS

| CN | 201477490 U | 5/2010 |
| CN | 103982532 A | 8/2014 |

(Continued)

*Primary Examiner* — Anthony M Haughton
*Assistant Examiner* — Theron S Milliser
(74) *Attorney, Agent, or Firm* — Anova Law Group, PLLC

(57) ABSTRACT

The present disclosure provides a shaft structure and an electronic device. A shaft structure includes a first fixing bracket, a second fixing bracket, and two or more dual-shaft modules. A dual-shaft module comprises a connecting element, a first shaft, a second shaft, a synchronizing element, a first fixing element, and a second fixing element. The first shaft and the second shaft are linked to the connecting element and rotate with respect to the connecting element. The synchronizing element is connected to the first shaft and the second shaft respectively to synchronize rotations of the first shaft and the second shaft. The first fixing element is connected to one end of the connecting element and the first fixing bracket. The second fixing element is connected to another end of the connecting element and the second fixing bracket.

17 Claims, 4 Drawing Sheets

(56) References Cited

U.S. PATENT DOCUMENTS

| | | | | |
|---|---|---|---|---|
| 2013/0322004 A1* | 12/2013 | Park | ................. | F16C 11/10 |
| | | | | 361/679.27 |
| 2014/0360296 A1* | 12/2014 | Hsu | ................. | G06F 1/1616 |
| | | | | 74/98 |
| 2015/0159413 A1* | 6/2015 | Chen | ................. | E05D 3/122 |
| | | | | 16/342 |
| 2015/0241978 A1* | 8/2015 | Lombardi | ................. | G06F 3/017 |
| | | | | 345/156 |
| 2015/0267450 A1* | 9/2015 | Chiang | ................. | G06F 1/1681 |
| | | | | 16/354 |
| 2015/0342068 A1* | 11/2015 | Su | ................. | G06F 1/1681 |
| | | | | 16/354 |
| 2015/0362956 A1* | 12/2015 | Tazbaz | ................. | G06F 1/1637 |
| | | | | 361/679.27 |
| 2015/0362958 A1* | 12/2015 | Shang | ................. | G06F 1/1681 |
| | | | | 361/679.58 |
| 2016/0011632 A1* | 1/2016 | Hsu | ................. | E05D 3/122 |
| | | | | 16/354 |
| 2016/0060927 A1* | 3/2016 | Xu | ................. | E05D 3/122 |
| | | | | 361/679.55 |
| 2016/0070310 A1* | 3/2016 | Holung | ................. | G06F 1/1681 |
| | | | | 361/679.09 |
| 2016/0201367 A1* | 7/2016 | Kato | ................. | E05D 3/12 |
| | | | | 361/679.09 |

FOREIGN PATENT DOCUMENTS

| | | |
|---|---|---|
| CN | 103982536 A | 8/2014 |
| CN | 204805308 U | 11/2015 |
| CN | 105402248 A | 3/2016 |

\* cited by examiner

SHAFT STRUCTURE AND ELECTRONIC DEVICE

CROSS-REFERENCES TO RELATED APPLICATIONS

This application claims the priority of Chinese Patent Application No. CN201710102196.9, entitled "SHAFT STRUCTURE AND ELECTRONIC DEVICE," filed on Feb. 24, 2017, the entire content of which is incorporated herein by reference.

FIELD OF THE DISCLOSURE

The present disclosure relates to the field of electronic technologies and, more particularly, relates to a shaft structure and an electronic device of applying the shaft structure.

BACKGROUND

Laptops, 2-in-1 tablet-laptop hybrid, or other electronic devices are usually designed with two parts which can rotate in relative positions. The two parts are often connected via a shaft. In some cases, the two parts are mostly jointed by two shaft modules. However, with the improvement of a thinner electronic device, the shaft structure needs to be made smaller. As a result, although the conventional shaft structure may still perform a relative rotation, it does not provide sufficient torque to support and maintain a relative position between the two parts of the electronic device. Therefore, to provide a thin shaft structure, and at the same time, provide sufficient torque to support the relative positions between the two parts has become a challenge.

BRIEF SUMMARY OF THE DISCLOSURE

In view of the foregoing, the present disclosure provides a shaft structure and an electronic device to solve the above-mentioned problems.

One aspect of the present disclosure provides a shaft structure. The shaft structure comprises a first fixing bracket, a second fixing bracket, and two or more dual-shaft modules, a dual-shaft module comprises a connecting element, a first shaft, a second shaft, a synchronizing element, a first fixing element and a second fixing element. The first shaft and the second shaft are linked to the connecting element and rotate with respect to the connecting element; the synchronizing element is connected to the first shaft and the second shaft respectively to synchronize rotations of the first shaft and the second shaft; the first fixing element is connected to one end of the connecting element and the first fixing bracket; and the second fixing element is connected to another end of the connecting element and the second fixing bracket.

The shaft structure may further comprise a protection sleeve; the protection sleeves connecting two dual-shaft modules. The protection sleeve has an interference fit with the connecting element; and the first shaft and the second shaft are arranged in the protection sleeve, and maintain a clearance between the protection sleeve respectively.

In some embodiments, the synchronizing element comprises a first twill region, a second twill region and a synchronizing gear; the first twill region being arranged in a periphery of the first shaft and connected to the first shaft, and the second twill region being arranged in a periphery of the second shaft and connected to the second shaft; and the synchronizing gear being arranged between the first twill region and the second twill region synchronize rotations of the first shaft and the second shaft.

The first fixing element is connected to the first fixing bracket by riveting or welding; and the second fixing element is connected to the second fixing bracket by riveting or welding.

In some embodiments, the first shaft rotates approximately 180° with respect to the connecting element in a first direction; and the second shaft rotates approximately 180° with respect to the connecting element in a second direction; the second direction being opposite to the first direction.

In some embodiments, the shaft structure may include 4 or 6 dual-shaft modules.

Another aspect of the present disclosure provides an electronic device. The electronic device includes the shaft structure described above, and a first member and a second member. The first member is connected to the first fixing bracket of the shaft structure, and the second member is connected to the second fixing bracket of the shaft structure.

The first member is detachably connected to the first fixing bracket, and the second member is detachably connected to the second fixing bracket. The first fixing bracket extends from the first member, and the second fixing bracket extends from the second member.

Another aspect of the present disclosure provides a device. The device includes the shaft structure described above, and a first member and a second member. The first member is connected to the first fixing bracket of the shaft structure, and the second member is connected to the second fixing bracket of the shaft structure. The first member is detachably connected to the first fixing bracket, and the second member is detachably connected to the second fixing bracket. The first fixing bracket extends from the first member, and the second fixing bracket extends from the second member.

In view of the above, the present disclosure provides the shaft structure including a plurality of dual-shaft modules. The plurality of dual-shaft modules can share the total torque required by an electronic device, so that torque loaded on each dual-shaft module is reduced, resulting in a smaller size and thickness for an individual dual-shaft module as well as the shaft structure. It accordingly realizes the thinning of the electronic devices. In addition, the present disclosure also provides the fixing brackets. The design of the fixing brackets coordinates the rotation of the multiple dual-shaft modules to reduce potential damages of the dual-shaft modules and to extend cycle life of the shaft structure.

The electronic device of the present disclosure includes the shaft structure as described. Other devices consistent with the present disclosure also include the shaft structure as described.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Reference will now be made in detail to exemplary embodiments of the disclosure, which will be illustrated in the accompanying drawings. Hereinafter, embodiments consistent with the disclosure will be described with reference to the drawings. Wherever possible, the same reference numbers will be used throughout the drawings to refer to the same or like parts. It is apparent that the described embodiments are some but not all of the embodiments of the present disclosure. Based on the disclosed embodiments, persons of ordinary skill in the art may derive other embodiments consistent with the present disclosure, all of which are within the scope of the present disclosure.

Other embodiments of the disclosure will be apparent to those skilled in the art from consideration of the specification and practice of the disclosure provided herein. It is intended that the specification and examples be considered as exemplary only, with a true scope and spirit of the disclosure being indicated by the claims.

Figure 1:
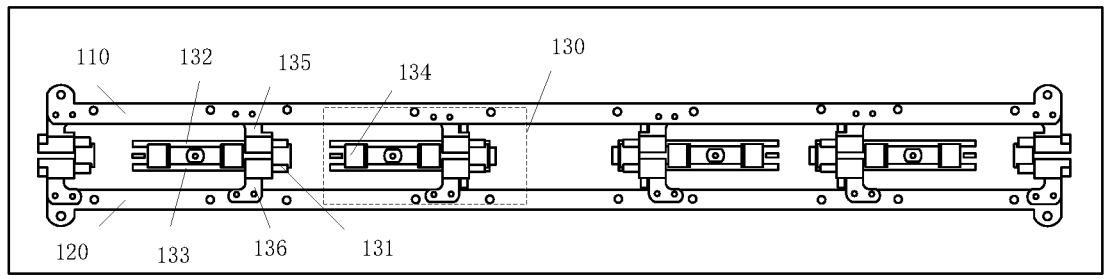
FIG. 1 shows a schematic structural diagram of a shaft structure consistent with the present disclosure.
Figure 2:
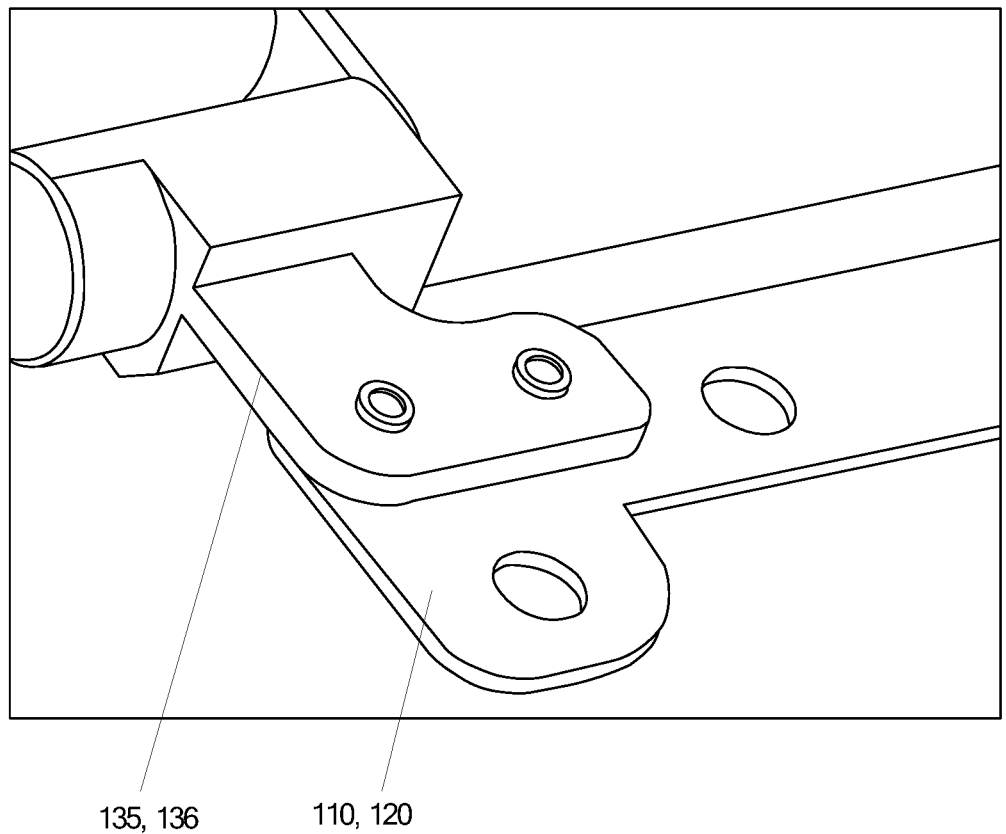
FIG. 2 is a partially enlarged view of the shaft structure as illustrated in FIG. 1.
Figure 3:
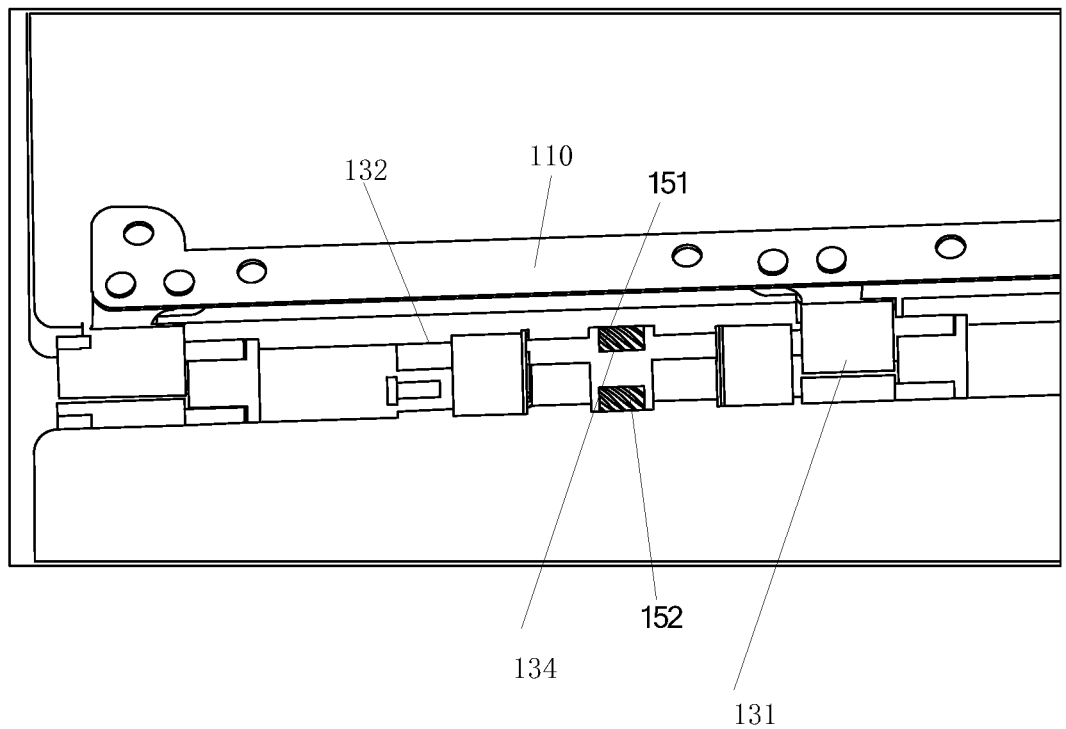
FIG. 3 is another partially enlarged view of the shaft structure as illustrated in FIG. 1.

As illustrated in FIGS. 1, 2 and 3, the present disclosure provides a shaft structure which comprises a first fixing bracket 110, a second fixing bracket 120 and N dual-shaft modules 130, wherein N is a positive integer. N may be more than or equal to 2.

At least one of the dual-shaft modules 130 comprises a connecting element 131, a first shaft 132, a second shaft 133, a synchronizing element 134, a first fixing element 135 and a second fixing element 136. For a desired performance, in some instances, each of the dual-shaft modules 130 may include all the above-stated elements.

The first shaft 132 and the second shaft 133 are installed to the connecting element 131 and arranged to rotate with respect to the connecting element 131 respectively. In some instances, the first shaft 132 and the second shaft 133 may be arranged side by side. The synchronizing element 134 is connected to the first shaft 132 and the second shaft 133 respectively so as to enable a synchronizing rotation of the first shaft 132 and the second shaft 133. The first fixing element 135 is connected to a first end of the connecting element 131 and the first fixing bracket 110 respectively. And the second fixing element 136 is connected to a second end of the connecting element 131 and the second fixing bracket 120 respectively. In some instances, the first end corresponds to the second end. Meanwhile, each the first fixing bracket 110 and the second fixing bracket 120 may provide a fixture to be connected to the shaft structure respectively.

The shaft structure provided by the present disclosure comprises at least two dual-shaft modules 130. In such a design, the plurality of dual-shaft modules 130 will share the desired torque in order for the shaft structure to connect two members, leading the torque provided by each dual-shaft module 130 reduced. And the compact size of the dual-shaft modules 130 can still meet the required torque. Meanwhile, it solves the conventional problems in which the large size of the dual-shaft modules results in thinner and lighter electronic devices unachievable. In other words, the present design of the plurality of dual-shaft modules 130 balances the requirement of a desired torque and a thinner design of the electronic devices.

As shown, each of the dual-shaft modules 130 of the present disclosure comprises the first shaft 132 and the second shaft 133, and the two shafts 132, 133 are mounted to the connecting element 131, and synchronized via the synchronizing element 134. Accordingly, the first shaft 131 and the second shaft 132 of each dual-shaft module 130 can rotate synchronously via the synchronizing element 134.

The connecting element 131 comprises two rotation chambers. The first shaft 132 and the second shaft 133 are installed in different chambers respectively. The two shafts 132, 133 rotate inside the chambers, leading the connecting element 131 also rotate with respect to the first shaft 132 and the second shaft 133.

The shaft structure of the present disclosure further comprises the first fixing bracket 110 and the second fixing bracket 120. The two fixing brackets 110, 120 are both connected to the plurality of dual-shaft modules 130. The introduction of the first fixing bracket 110 and the second fixing bracket 120 coordinates the plurality of dual-shaft modules 130, so that the problem, in which some of the dual-shaft modules 130 have larger rotation angles while some of them have smaller rotation angles or even a zero angle, can be avoided. Accordingly, the life cycle of each dual-shaft module 130 and the whole shaft structure can be extended.

In addition, by means of the first fixing bracket 110 and the second fixing bracket 120, the shaft structure of the present disclosure may be manufactured individually. For instance, the shaft structure may be produced in other places beforehand and afterwards assembled to electronic devices.

The first fixing element 135 and the second fixing element 136 are secured to the connecting element 131, and respectively are connected to the corresponding fixing brackets 110, 120. In some embodiments, this arrangement may be achieved by a screw connection or a snap connection. FIG. 2 illustrates an enlarged schematic diagram of a connection manner between the fixing element and the fixing bracket, in which a screw connection is shown. The fixing element as shown in FIG. 2 may refer to the first fixing element 135 or the second fixing element 136, while the corresponding fixing bracket as shown may refer to the first fixing bracket 110 or the second fixing bracket 120.

FIG. 3 shows another enlarged schematic diagram of the shaft structure consistent with the present disclosure. In FIG. 3, the first shaft 132, the connecting element 131, the synchronizing element 134 and other components are shown.

In short, the shaft structure provided by the present disclosure can resolve issued related to the thinning of the electronic devices and the need for sufficient torque. Meanwhile, by means of the fixing brackets, the shaft structure of the present disclosure is under protection and therefore enjoys a longer cycle life.

Figure 4:
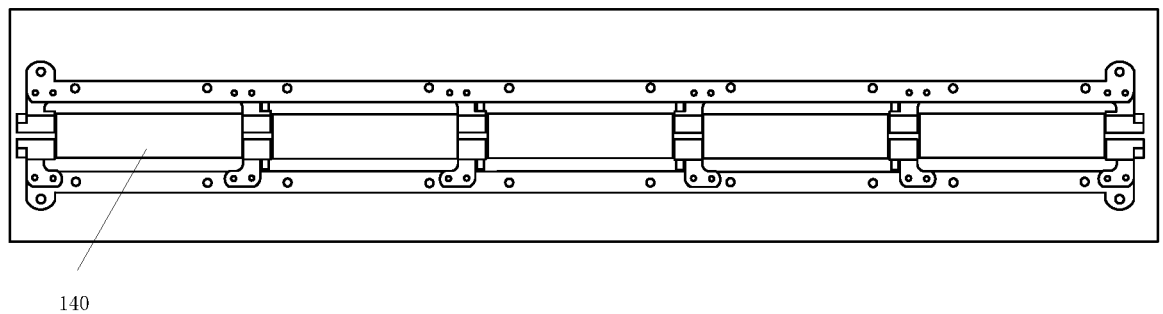
FIG. 4 shows a schematic structural diagram of another shaft structure with protection sleeves consistent with the present disclosure.
Figure 5:
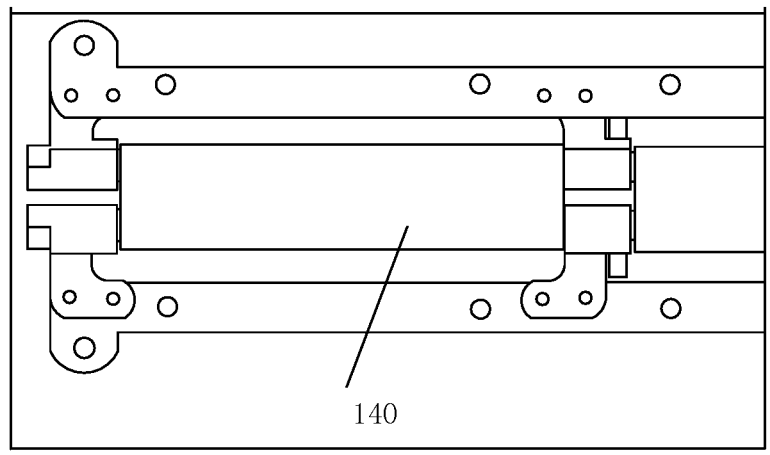
FIG. 5 is a partially enlarged view of the shaft structure as illustrated in FIG. 4.

As illustrated in FIGS. 4 and 5, in some instances, the shaft structure consistent with the present disclosure may further comprise N−1 protection sleeves. Each of the protection sleeves 140 connects and covers two adjacent dual-shaft modules 130. The protection sleeve 140 may be mounted to a periphery of the shaft structure and provide a protection of the inner components of the shaft structure in order to extend the cycle life of the shaft structure. In some instances, the protection sleeve 140 may have an interference fit with the connecting element 131. The first shaft 132 and the second shaft 133 are arranged in the protection sleeve 140, remaining a clearance between the protection sleeves 140 respectively. This arrangement can enable the sleeve protection 140 is mounted and secured to the connecting element 131 without any additional fixture. In addition, the interference fit can prevent the protection sleeve 140 from rotating outside the connecting element 131.

In some instances, the synchronizing element 134 comprises a first twill region 151, a second twill region 152 and a synchronizing gear (not shown). The first twill region 151 is arranged in a periphery of the first shaft 132 and connected to the first shaft 132. The second twill region 152 is arranged in a periphery of the second shaft 133 and connected to the second shaft 133. The synchronizing gear is located between the first twill region 151 and the second twill region 152 so as to enable the synchronizing rotation of the first shaft 132 and the second shaft 133.

In some instances, a portion of an outer surface of the first shaft 132 may be provided with concaved twills to form the first twill region 151, while a portion of an outer surface of the second shaft 133 may be provided with concaved twills to form the second twill region 152. The twills as mentioned may be threads, and the threads may be arranged tilt in distribution relative to an axis of the shafts 132, 133.

The synchronizing element 134 may further comprise the synchronizing gear. The synchronizing gear engages with the first twill region 151 and the second twill region 152 respectively. In such an arrangement, as long as one of the shafts 132, 133 rotates, it will cause the synchronizing gear to rotate. And the rotation of the synchronizing gear will further bring the rotation of the other shaft. As such, the synchronous rotation of the two shafts 132, 133 in each dual-shaft module 130 can be achieved. Therefore, the synchronizing element 134 provided by the present disclosure enjoys the merits of simple structures and facilitation.

In some instances, the first fixing element 135 may be connected to the first fixing bracket 110 by riveting or welding. And the second fixing element 136 may be connected to the second fixing bracket 120 by riveting or welding as well. The first fixing element 135 and the second fixing element 136 are secured to the corresponding fixing brackets 110, 120 by riveting or welding to provide a stable connection.

In some instances, the first shaft 132 is configured to make an approximately 180° rotation with respect to the connecting element 131 in a first direction. And the second shaft 133 is configured to make an approximately 180° rotation with respect to the connecting element 131 in a second direction, wherein the second direction is opposite to the first direction. In some instances, the rotation angles of the first shaft 132 and the second shaft 133 can each reach 180°, even up to 360°. As such, the two members connected to the shaft structure can achieve a 360° rotation.

In some instances, N may be 4 or 6. When N becomes 4 or 6, it meets the goal to share the torque as required. However, when N becomes too large, it may result in increasing complexity of structures and related cost to install the excessive dual-shaft modules 130.

Figure 6:
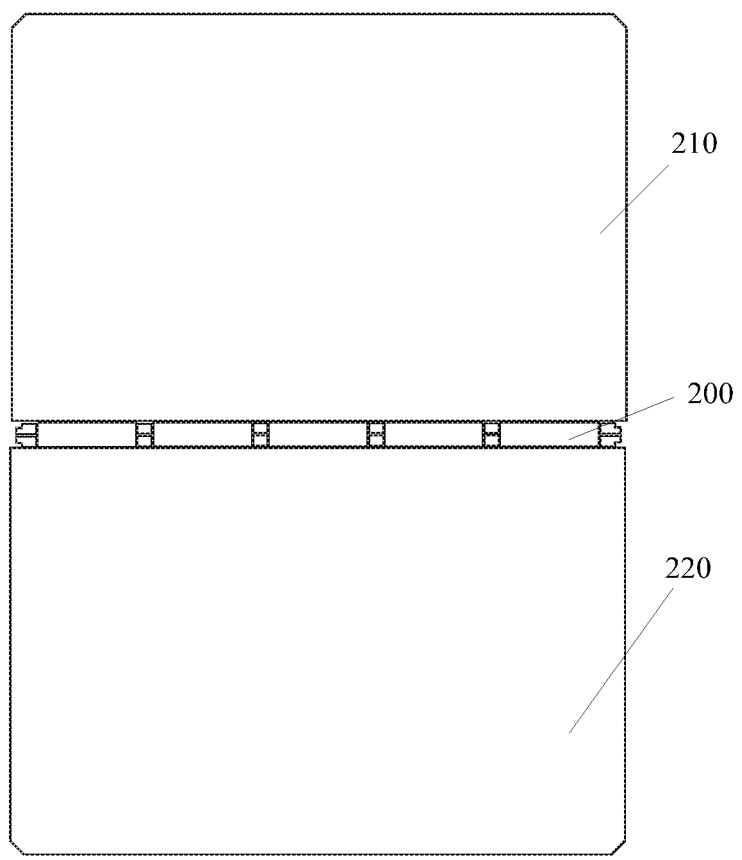
FIG. 6 is a schematic diagram showing an open state of an electronic device consistent with the present disclosure.
Figure 7:
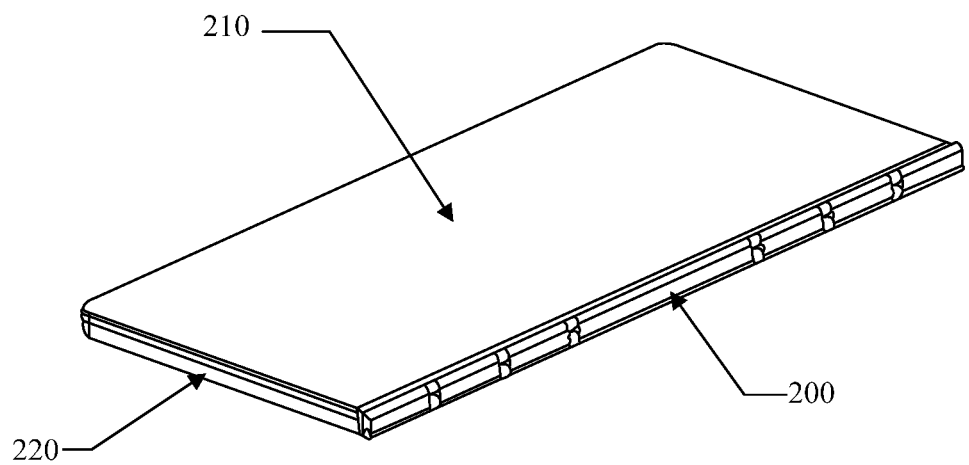
FIG. 7 is a schematic diagram showing a closed state of the electronic device consistent with the present disclosure.

As illustrated in FIGS. 6 and 7, the present disclosure also provides an electronic device which comprises a first member 210, a second member 220 and the shaft structure 200 as described in any of the above embodiments. The first member 210 is connected to the shaft structure 200 via the first fixing bracket 110, while the second member 220 is connected to the shaft structure 200 via the second fixing bracket 120.

The shaft structure 200 in the present disclosure can provide a larger torque with a design of light weight and small thickness. In the present disclosure, the two fixing brackets 110, 120 are connected to the corresponding members 210, 220 respectively by means of a screw connection, a snap connection, or welding to achieve a stable support for the first member 210 and the second member 220, in addition to realizing a thinner and lighter design.

In some instances, the first fixing bracket 110 extends from a periphery of the first member 210, while the second fixing bracket 120 extends from a periphery of the second member 220. As such, the thickness of the shaft structure 200 can be made smaller to achieve a thinner electronic device. Generally speaking, a first thickness of the shaft structure 200 may not be greater than a second thickness of the first member 210 together with the second member 220 when the two members 210, 220 are fully engaged.

FIG. 6 is a schematic diagram showing a 180° open-state of the first member 210 and the second member 220 via the shaft structure 200. FIG. 7 is another schematic diagram showing a 0° closed-state of the first member 210 and the second member 220.

In some instances, the first member 210 is detachably connected to the first fixing bracket 110, while the second member 220 is detachably connected to the second fixing bracket 120. By taking advantages of detachable components, users can easily disassemble the electronic device according to their needs, also to facilitate the maintenance of different parts.

For example, the first member 210 may include a display screen and other components. The first member 210 individually can be used as a tablet, or with combination to the second member 220 as a laptop. In such a case, the first member 210 may be detached from the first fixing bracket 110, while the second member 220 may be fixed to the second fixing bracket 120. In another instance, the first member 210 and the second member 220 may both include a display screen. The two displays screen may of an identical area or type and may be used for an individual display or a joint display. In this case, the first member 210 and the second member 220 can be both detachably connected to the shaft structure 200, so that the first member 210 and the second member 220 can be used alone as a tablet, as a laptop, or as an electronic reader. In the case where the first member 210 and the second member 220 each includes a display screen, they can be used as an electronic reader and simulate a real paper book. That means the two members 210, 220 show the contents of two adjacent pages, and when flipping, the two members 210, 220 simultaneously refresh the display.

As described above, the disclosed embodiments are exemplary. The scope of the present disclosure is not limited there to the specific embodiments. Other embodiments of the disclosure would be apparent to those skilled in the art from consideration of the specification and practice of the present disclosure herein. It is intended that the specification and embodiments be considered as exemplary only, with a true scope and spirit of the disclosure being indicated by the claims.

What is claimed is:

1. A shaft structure comprising: a first fixing bracket, a second fixing bracket, a plurality of dual-shaft modules, and a plurality of protection sleeves, each of the first fixing bracket and the second fixing bracket having a one-piece structure and being connected to all of the plurality of dual-shaft modules, and each of the plurality of dual-shaft modules comprising: a connecting element, a first shaft, a second shaft, a synchronizing element, a first fixing element, and a second fixing element,
wherein:
the first shaft and the second shaft are linked to the connecting element and rotate with respect to the connecting element;
the synchronizing element includes a first twill region and a second twill region connected to the first shaft and the second shaft, respectively, to synchronize rotations of the first shaft and the second shaft;
the first twill region including threads being arranged tilt in distribution relative to an axis of the first shaft, and the second twill region including threads being arranged tilt in distribution relative to an axis of the second shaft;
the first fixing element is fixedly connected to one end of the connecting element and fixedly connected to the first fixing bracket, and the first shaft rotates with respect to the first fixing element;
the second fixing element is fixedly connected to another end of the connecting element and fixedly connected to the second fixing bracket, and the second shaft rotates with respect to the second fixing element;
each of the plurality of protection sleeves connects adjacent dual-shaft modules of the plurality of dual-shaft modules;
the first shaft and the second shaft of each of the plurality of dual-shaft modules are arranged inside an adjacent one of the plurality of protection sleeves and maintain a clearance from the adjacent one of the plurality of the protection sleeves;
a portion of the connecting element of each of the plurality of dual-shaft modules that is not covered by the plurality of protection sleeves is exposed to outside; and
a number of the plurality of protection sleeves is one less than a number of the plurality of dual-shaft modules.

2. The shaft structure according to claim 1, wherein: the synchronizing element further comprises a synchronizing gear; the first twill region being arranged in a periphery of the first shaft and connected to the first shaft, and the second twill region being arranged in a periphery of the second shaft and connected to the second shaft; and the synchronizing gear being arranged between the first twill region and the second twill region and configured to synchronize the rotations of the first shaft and the second shaft.

3. The shaft structure according to claim 1, wherein: the first fixing element is connected to the first fixing bracket by riveting or welding; and the second fixing element is connected to the second fixing bracket by riveting or welding.

4. The shaft structure according to claim 1, wherein: the first shaft rotates approximately 180° with respect to the connecting element in a first direction; and the second shaft rotates approximately 180° with respect to the connecting element in a second direction; the second direction being opposite to the first direction.

5. The shaft structure according to claim 1, wherein the shaft structure includes four or six dual-shaft modules.

6. The shaft structure according to claim 1, wherein: the synchronizing element further comprises a synchronizing gear; the first twill region being arranged in a periphery of the first shaft and connected to the first shaft, and the second twill region being arranged in a periphery of the second shaft and connected to the second shaft; and the synchronizing gear being arranged between the first twill region and the second twill region and configured to synchronize the rotations of the first shaft and the second shaft.

7. The shaft structure according to claim 1, wherein: the synchronizing element further comprises a synchronizing gear; the first twill region being arranged in a periphery of the first shaft and connected to the first shaft, and the second twill region being arranged in a periphery of the second shaft and connected to the second shaft; and the synchronizing gear being arranged between the first twill region and the second twill region and configured to synchronize the rotations of the first shaft and the second shaft.

8. The shaft structure according to claim 1, wherein: the first fixing element is connected to the first fixing bracket by riveting or welding; and the second fixing element is connected to the second fixing bracket by riveting or welding.

9. The shaft structure according to claim 1, wherein: the first shaft rotates approximately 1800 with respect to the connecting element in a first direction; and the second shaft rotates approximately 1800 with respect to the connecting element in a second direction; the second direction being opposite to the first direction.

10. An electronic device, comprising a shaft structure, a first member, and a second member, the shaft structure comprising a first fixing bracket, a second fixing bracket, a plurality of dual-shaft modules, and a plurality of protection sleeves, each of the first fixing bracket and the second fixing bracket having a one-piece structure and being connected to all of the plurality of dual-shaft modules, the first member being connected to the first fixing bracket of the shaft structure, and the second member being connected to the second fixing bracket of the shaft structure, each of the plurality of dual-shaft modules comprising:
a connecting element, a first shaft, a second shaft, a synchronizing element, a first fixing element, and a second fixing element, wherein:
the first shaft and the second shaft are linked to the connecting element and rotate with respect to the connecting element;
the synchronizing element includes a first twill region and a second twill region connected to the first shaft and the second shaft, respectively, to synchronize rotations of the first shaft and the second shaft;
the first twill region including threads being arranged tilt in distribution relative to an axis of the first shaft, and the second twill region including threads being arranged tilt in distribution relative to an axis of the second shaft;
the first fixing element is fixedly connected to one end of the connecting element and fixedly connected to the first fixing bracket, and the first shaft rotates with respect to the first fixing element;
the second fixing element is fixedly connected to another end of the connecting element and fixedly connected to the second fixing bracket, and the second shaft rotates with respect to the second fixing element;
each of the plurality of protection sleeves connects adjacent dual-shaft modules of the plurality of dual-shaft modules;
the first shaft and the second shaft of each of the plurality of dual-shaft modules are arranged inside an adjacent one of the plurality of protection sleeves and maintain a clearance from the adjacent one of the plurality of the protection sleeves;

a portion of the connecting element of each of the plurality of dual-shaft modules that is not covered by the plurality of protection sleeves is exposed to outside; and a number of the plurality of protection sleeves is one less than a number of the plurality of dual-shaft modules.

11. The electronic device according to claim 10, wherein: the first member is detachably connected to the first fixing bracket, and the second member is detachably connected to the second fixing bracket.

12. The electronic device according to claim 10, wherein: the first member includes a display screen.

13. The electronic device according to claim 10, wherein: the second member includes a display screen.

14. The electronic device according to claim 13, wherein the first fixing bracket extends from the first member, and the second fixing bracket extends from the second member.

15. The electronic device according to claim 10, wherein the first member includes a display screen, and the second member includes a display screen.

16. A device, comprising a shaft structure, a first member, and a second member, the shaft structure comprising a first fixing bracket, a second fixing bracket, a plurality of dual-shaft modules, and a plurality of protection sleeves, each of the first fixing bracket and the second fixing bracket having a one-piece structure and being connected to all of the plurality of dual-shaft modules, the first member being connected to the first fixing bracket of the shaft structure, and the second member being connected to the second fixing bracket of the shaft structure, each of the plurality of dual-shaft modules comprising:

a connecting element, a first shaft, a second shaft, a synchronizing element, a first fixing element, and a second fixing element, wherein:

the first shaft and the second shaft are linked to the connecting element and rotate with respect to the connecting element;

the synchronizing element includes a first twill region and a second twill region connected to the first shaft and the second shaft, respectively, to synchronize rotations of the first shaft and the second shaft;

the first twill region including threads being arranged tilt in distribution relative to an axis of the first shaft, and the second twill region including threads being arranged tilt in distribution relative to an axis of the second shaft;

the first fixing element is fixedly connected to one end of the connecting element and fixedly connected to the first fixing bracket, and the first shaft rotates with respect to the first fixing element;

the second fixing element is fixedly connected to another end of the connecting element and fixedly connected to the second fixing bracket, and the second shaft rotates with respect to the second fixing element;

each of the plurality of protection sleeves connects adjacent dual-shaft modules of the plurality of dual-shaft modules;

the first shaft and the second shaft of each of the plurality of dual-shaft modules are arranged inside an adjacent one of the plurality of protection sleeves and maintain a clearance from the adjacent one of the plurality of the protection sleeves;

a portion of the connecting element of each of the plurality of dual-shaft modules that is not covered by the plurality of protection sleeves is exposed to outside; and a number of the plurality of protection sleeves is one less than a number of the plurality of dual-shaft modules.

17. The shaft structure according to claim 1, wherein the protection sleeve has an interference fit with the connecting element.

* * * * *